United States Patent [19]
Penza

[11] Patent Number: 5,823,557
[45] Date of Patent: Oct. 20, 1998

[54] PLATFORM FOR MOUNTING SOUND EQUIPMENT ON A CYCLE

[76] Inventor: Phillip Penza, 510 W. Northern Ave., Phoenix, Ariz. 85021

[21] Appl. No.: 688,910

[22] Filed: Jul. 31, 1996

[51] Int. Cl.[6] ................................................ B62H 1/10
[52] U.S. Cl. .................... 280/304.5; 280/288.4; 224/426; 224/433; 224/440
[58] Field of Search ............. 280/288.4, 304.5; 224/426, 433, 435, 440, 463; 455/347, 351, 348, 344

[56] References Cited

U.S. PATENT DOCUMENTS

| | | | |
|---|---|---|---|
| 590,936 | 9/1897 | Perkins | 224/426 |
| 595,959 | 12/1897 | Marshall, Jr. | 224/426 |
| 4,050,493 | 9/1977 | Cho | 455/344 |
| 4,279,342 | 7/1981 | Van Pelt | 455/347 |
| 4,843,624 | 6/1989 | Rashak | 455/351 |
| 4,971,320 | 11/1990 | Nesbit et al. | 455/347 |
| 5,001,779 | 3/1991 | Eggert et al. | 455/346 |
| 5,031,807 | 7/1991 | Tiffany | 224/35 |
| 5,159,712 | 10/1992 | Schneider et al. | 455/351 |
| 5,249,721 | 10/1993 | Brooks | 224/35 |

*Primary Examiner*—Daniel G. DePumpo
*Attorney, Agent, or Firm*—Frank J. McGue

[57] ABSTRACT

A platform is disclosed for detachably mounting sound equipment to a cycle frame. The platform comprises a hollow housing which is detachably mounted to the cycle frame. Shelves are provided for mounting an amplifier, a music player and at least one speaker within said housing. A door provides access to the interior of the hollow housing.

18 Claims, 6 Drawing Sheets

PLATFORM FOR MOUNTING SOUND EQUIPMENT ON A CYCLE

TECHNICAL FIELD

This invention relates to a platform for sound equipment, and, more particularly, to a platform for sound equipment which mounts to a cycle for supporting sound equipment components thereon.

BACKGROUND OF THE INVENTION

Various types of platforms for mounting sound equipment are well known. Examples include portable stereos commonly referred to as "boom boxes", Sony's Walkman and car stereos. However, none of the known prior art disclose the device set forth herein.

SUMMARY OF THE INVENTION

It is an object of this invention to provide a platform for sound equipment which can be detachably mounted to a cycle frame.

It is a further object of this invention to provide a platform which can be custom fitted with stereo components as desired.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which.

DESCRIPTION OF THE PREFERRED EMBODIMENT

Referring more particularly to the drawings by characters of reference, FIGS. 1–6 disclose one embodiment of a platform 10 for detachably mounting a sound system to a bicycle frame 12. It will be understood by those skilled in the art that while the present discussion relates to a bicycle frame 12 having the illustrated configuration, the principles of the invention are equally applicable to other cycle configurations, as, for example, a child's bicycle or a tricycle.

In addition, the discussions below will discuss how to mount sound equipment components such as speakers, amplifiers and the like within platform 10. Those skilled in the art will understand that those components are in electrical communication with one another to generate sound. However, the present invention relates to the platform itself, not a particular sound system mounted therein.

Figure 1:
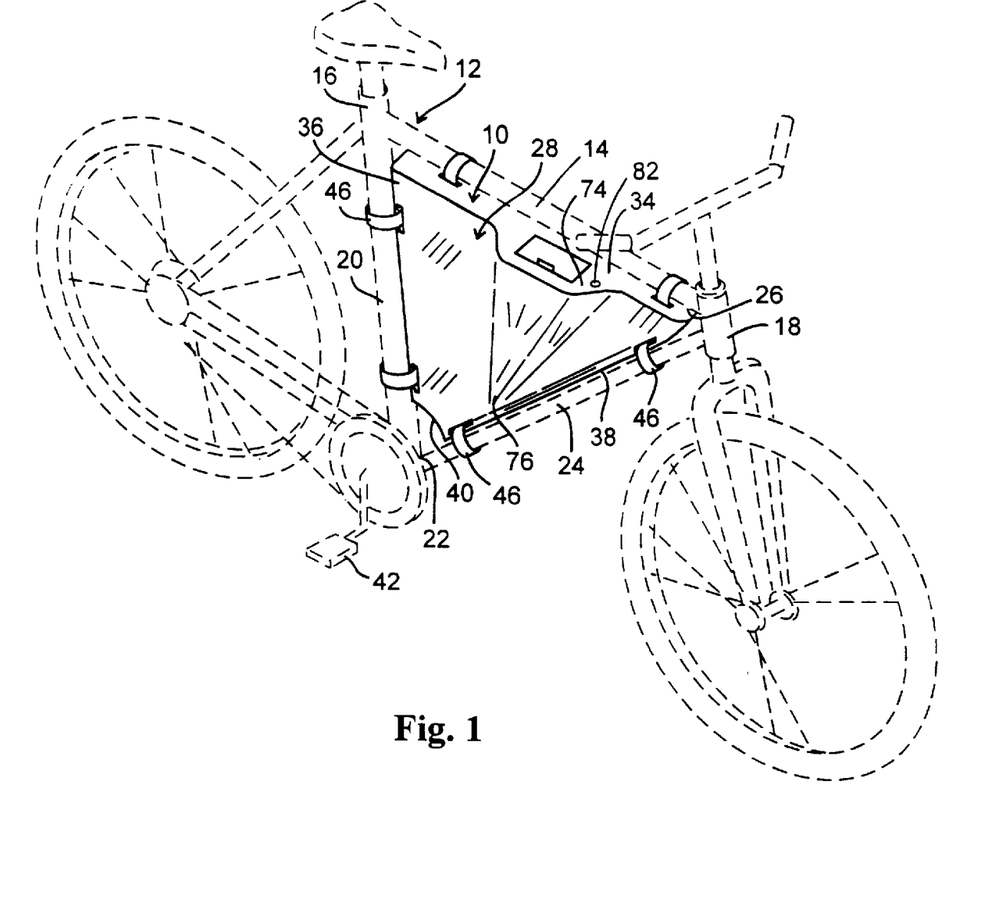
FIG. 1 is a perspective view of one embodiment of the present invention mounted on a bicycle.

As best seen in FIG. 1, bicycle frame 12 is comprised of a first tubular member 14 extending horizontally between a seat bracket 16 and a front bracket 18, a second tubular member 20 connecting to the seat end of first tubular member 14 extending downwardly therefrom to a bottom bracket 22 and a third tubular member 24 extending diagonally between the bottom bracket 22 and the front bracket 18. First, second and third tubular members 14, 20 and 24 in combination form a triangular opening 26.

As the actual operation of bicycle 12 is well known to those skilled in the art and does not form part of this invention, further discussions relating to its operation and the operation of components thereof will not be further discussed herein.

In the illustrated embodiment, the invention comprises a hollow housing 28 having a left shell 30 and a right shell 32 which is cross sectionally shaped to fit within the interior of triangular opening 26. As best seen in FIG. 1, in the embodiment illustrated therein an upper edge 34 of housing 28 abuts first tubular member 14, a rear edge 36 of housing 28 abuts second tubular member 20 and a front edge 38 of housing abuts third tubular member 24. A lower edge 40 of housing 28 is arcuate in shape to maintain free clearance for pedals 42 of the bicycle.

To mount housing 28 to tubular members 14, 20 and 24, slots 44 are positioned along the periphery of both shells 30, 32 of housing 28. Straps 46 extend through slots 44 and are wrapped around the respective tubular members 14, 20 and 24. Preferably, such straps 46 use hook and loop fasteners to secure each strap 46 to itself. However, as those skilled in the art will recognize, other fastening means including belt buckles, snaps and the like can be employed satisfactorily. The purpose of the fastening means chosen is to detachably secure housing 28 to the frame 12.

Figure 2:
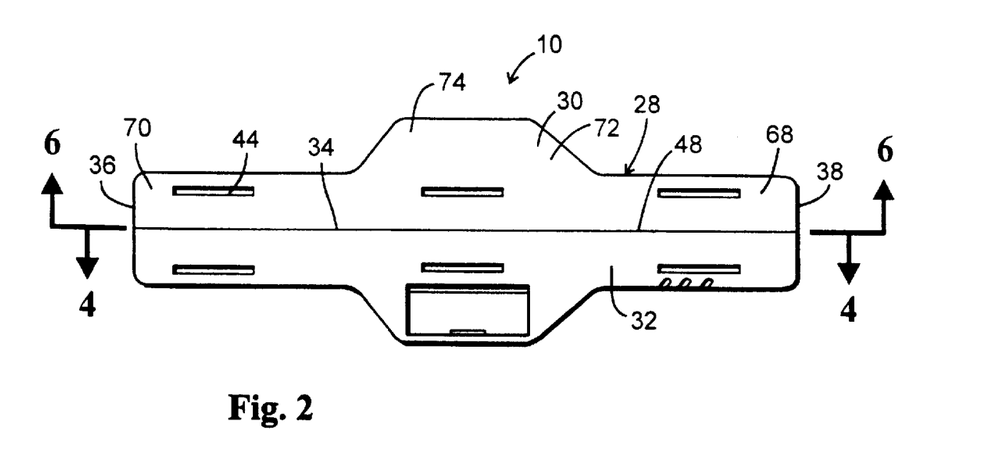
FIG. 2 is a top view of the device depicted in FIG. 1.

As best seen in FIG. 2, mating shells 30, 32 are joined along a centerline 48 to form hollow housing 28. Means for joining the two shells include welding along centerline 48. However, those skilled in the art will recognize many other methods of joining shells 30, 32 are possible, ranging from screws to snap-fits. Housing 28 is narrow enough to permit a rider to pedal without interference.

Housing 28 is preferably made of polyethylene, however, those skilled in the art will recognize that many other materials would be suitable for use. One particular variation of note is to manufacture the device of a transparent plastic whereby the components are visible to the user.

Figure 5:
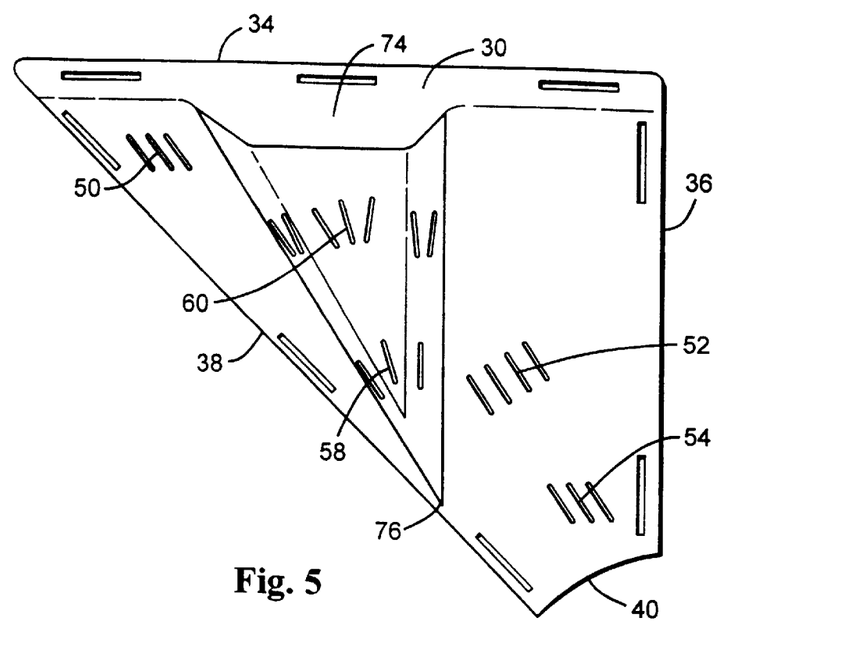
FIG. 5 is a left side view of the device depicted in FIG. 1.

In the illustrated embodiment of FIG. 2, it can be seen that upper edge 34 of each shell 30 and 32 includes a narrow front end 68 and narrow rear end 70 with a wider center 72 therebetween. Each center 72 includes a wide top 74 which tapers to a point 76 as best seen in FIGS. 3 and 5.

Figure 3:
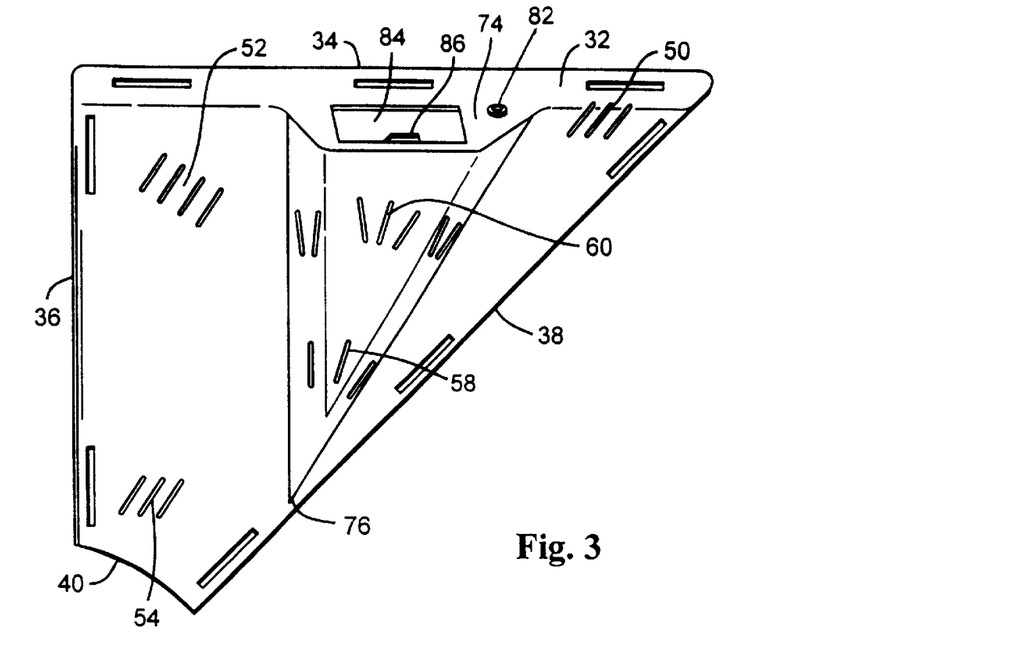
FIG. 3 is an right side view of the device depicted in FIG. 1.
Figure 4:
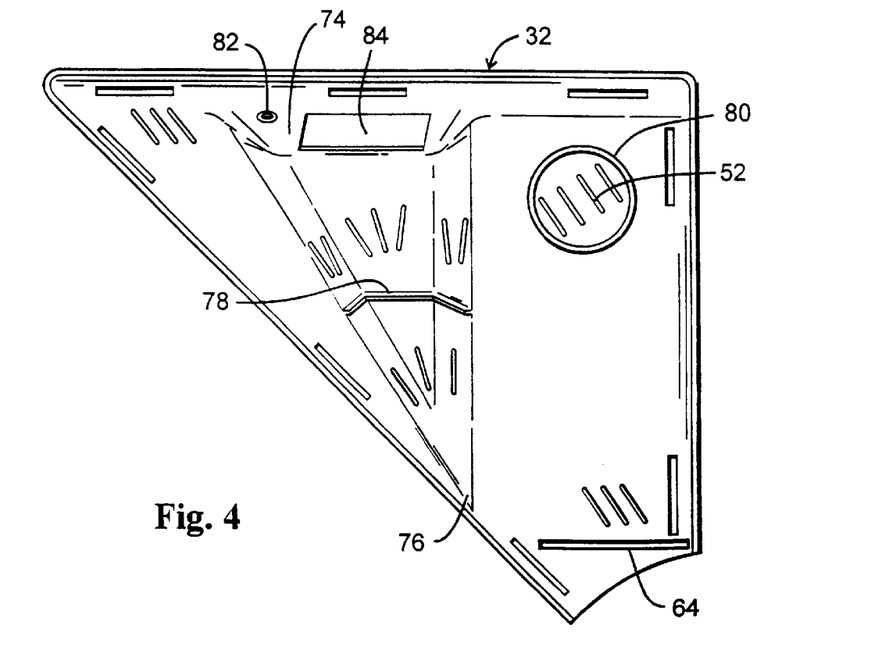
FIG. 4 is a cross sectional side view of the device of FIG. 2 taken along line 4—4.

As best seen in FIGS. 3 and 4, extending through right shell 32 are an amplifier vent 50 abutting front edge 38 proximate to upper edge 34, a speaker vent 52 positioned proximate to the junction of upper edge 34 and rear edge 36, a battery vent 54 positioned abutting lower edge 40, a bass speaker vent 58 positioned proximate to lower point 76 of center 72 and a music player vent 60 positioned in center 72 proximate to top 74. Each vent 50, 52, 54, 58 and 60 comprises a plurality of slits 56 extending completely through right shell 32. The purpose of speaker vent 52 and bass speaker vent 58 are to allow sound generated by speakers mounted within right shell 32 to exit therefrom while still providing protection thereto. The purpose of amplifier vent 50, battery vent 54 and music player vent 60 is to allow air to circulate therethrough to cool the amplifier, battery and music players mounted within right shell 32 abutting said vents.

As best seen in FIG. 4, a number of mounting means are provided for mounting desired components such as speakers, batteries, amplifiers and music players to the interior of right shell 32 of housing 28. It will be understood by those skilled in the art that many other mounting means as well as variations on the mounting means disclosed herein are possible. Mounting means secure the desired components firmly within right shell 32 and hence housing 28 against the vibration encountered when riding a bicycle.

In the illustrated embodiment, an L-shaped shelf 62 is provided for an amplifier (not shown) to rest thereon. The amplifier rests upon L-shaped shelf 62 and is secured thereto by, for example, adhesives or screws (not shown).

A horizontal shelf 64 is provided for a battery (not shown) to be mounted thereto. The battery rests upon horizontal shelf 64 and is secured thereto by, for example, adhesives or screws (not shown).

A generally U-shaped shelf 78 is mounted within center 72 about midway between top 74 and point 76. In the illustrated embodiment, a music player (not shown) is mounted atop U-shaped shelf 78 while a bass speaker (not shown) is mounted below U-shaped shelf 78. The bass speaker is secured to U-shaped shelf 78 by, for example, adhesives or screws.

A circular mount 80 is provided for a speaker (not shown) to be mounted thereto. The speaker rests within circular mount 80 and is secured thereto by, for example, adhesives or screws (not shown).

Extending through right shell 32 is an jack hole 82 which can receive an jack (not shown) therein if desired. Such a jack is used for earphones, if the user prefers to listen to music yet not disturb nearby individuals. Or, alternatively, the jack could connect the music components contained therein to, for example, a Sony Walkman™ music player.

Access to the music player is provided in the illustrated example by a door 84 having a handle 86 mounted thereon. Door 84 is hinged opposite handle 86 to rotate to the open position. Alternatively, door 84 slides laterally to open.

The term "music player" is defined as any of a variety of devices such as a cassette player, a CD player, a radio receiver or any other type of device for generating sound. The music player is mounted beneath door 84 thereby allowing the rider access thereto. The music player is mounted either permanently or detachably as desired by the rider.

In one embodiment, a cassette player is mounted permanently to U-shaped shelf 78. The rider has access thereto via door 84. In this embodiment, the controls of the cassette player control the sound volume and other controls of the system. In another embodiment, a portable music player such as a Sony Walkman is detachably mounted under door 84 on U-shaped shelf 78. The player connects to the system via jack hole 82 and the player is used to control the sound volume and other features of the system.

Figure 6:
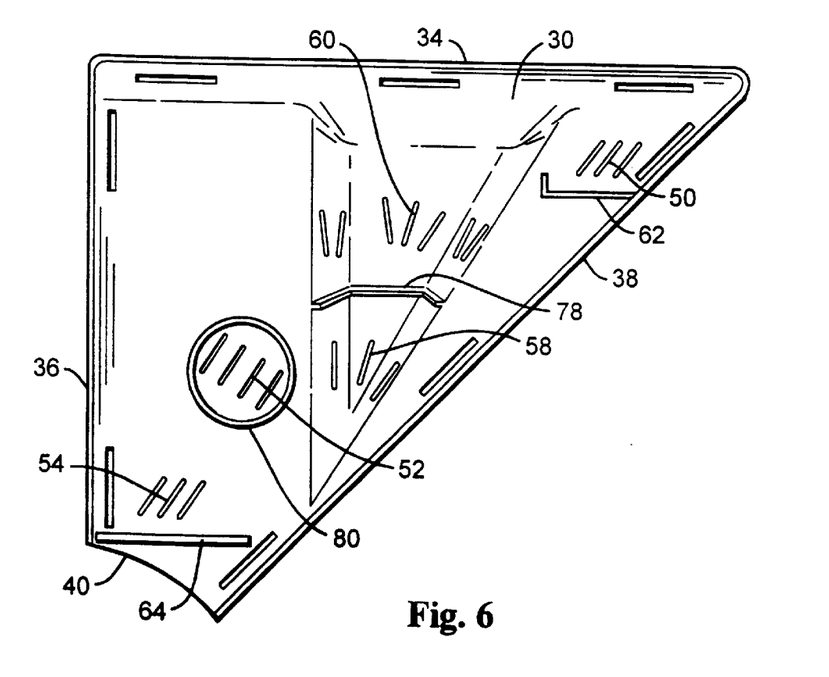
FIG. 6 is a cross sectional side view of the device of FIG. 2 taken along line 6—6.

As best seen in FIGS. 5 and 6, extending through left shell 30 are an amplifier vent 50 positioned proximate to the junction of upper edge 40 and front edge 38, a speaker vent 52 positioned midway between upper edge 34 and lower edge 40, a battery vent 54 positioned abutting lower edge 40, a bass speaker vent 58 positioned proximate to lower point 76 of center 72 and a music player vent 60 positioned in center 72 proximate to top 74. Vents 50, 54, 58 and 60 correspond positionally with vents 50, 54, 58 and 60 in right shell 32. However, speaker vent 52 in left shell 30 is positioned downwardly of speaker vent 52 in right shell 32.

Each vent 50, 52, 54, 58 and 60 comprises a plurality of slits 56 extending completely through left shell 30. The purpose of speaker vent 52 and bass speaker vent 58 are to allow sound generated by speakers mounted within left shell 30 to exit therefrom while still providing protection thereto. The purpose of amplifier vent 50, battery vent 54 and music player vent 60 is to allow air to circulate therethrough to cool the amplifier, battery and music players mounted within left shell 30 abutting said vents.

As best seen in FIG. 6, a number of mounting means are provided for mounting desired components such as speakers, batteries, amplifiers and music players to the interior of left shell 30 of housing 28. It will be understood by those skilled in the art that many other mounting means as well as variations on the mounting means disclosed herein are possible. Mounting means secure the desired components firmly within left shell 30 and hence housing 28 against the vibration encountered when riding a bicycle.

In the illustrated embodiment, an L-shaped shelf 62 positioned underneath amplifier vent 50 for an amplifier (not shown) to rest thereon. The amplifier rests upon L-shaped shelf 62 and is secured thereto by, for example, adhesives or screws (not shown).

A horizontal shelf 64 is positioned underneath battery vent provided for a battery (not shown) to be mounted thereto. The battery rests upon horizontal shelf 64 and is secured thereto by, for example, adhesives or screws (not shown).

A generally U-shaped shelf 78 is mounted within center 72 about midway between top 74 and point 76. In the illustrated embodiment, a music player (not shown) is mounted atop U-shaped shelf 78 while a bass speaker (not shown) is mounted below U-shaped shelf 78. The bass speaker is secured to U-shaped shelf 78 by, for example, adhesives or screws.

A circular mount 80 is provided underneath speaker vent 52 for a speaker (not shown) to be mounted thereto. The speaker rests within circular mount 80 and is secured thereto by, for example, adhesives or screws (not shown).

FIGS. 7–12 illustrate a modification of platform 10 shown in FIGS. 1–6 wherein like parts are given the same reference characters. This platform 10 differs from the previous modification in showing a more aerodynamic design.

Figures 7, 8:
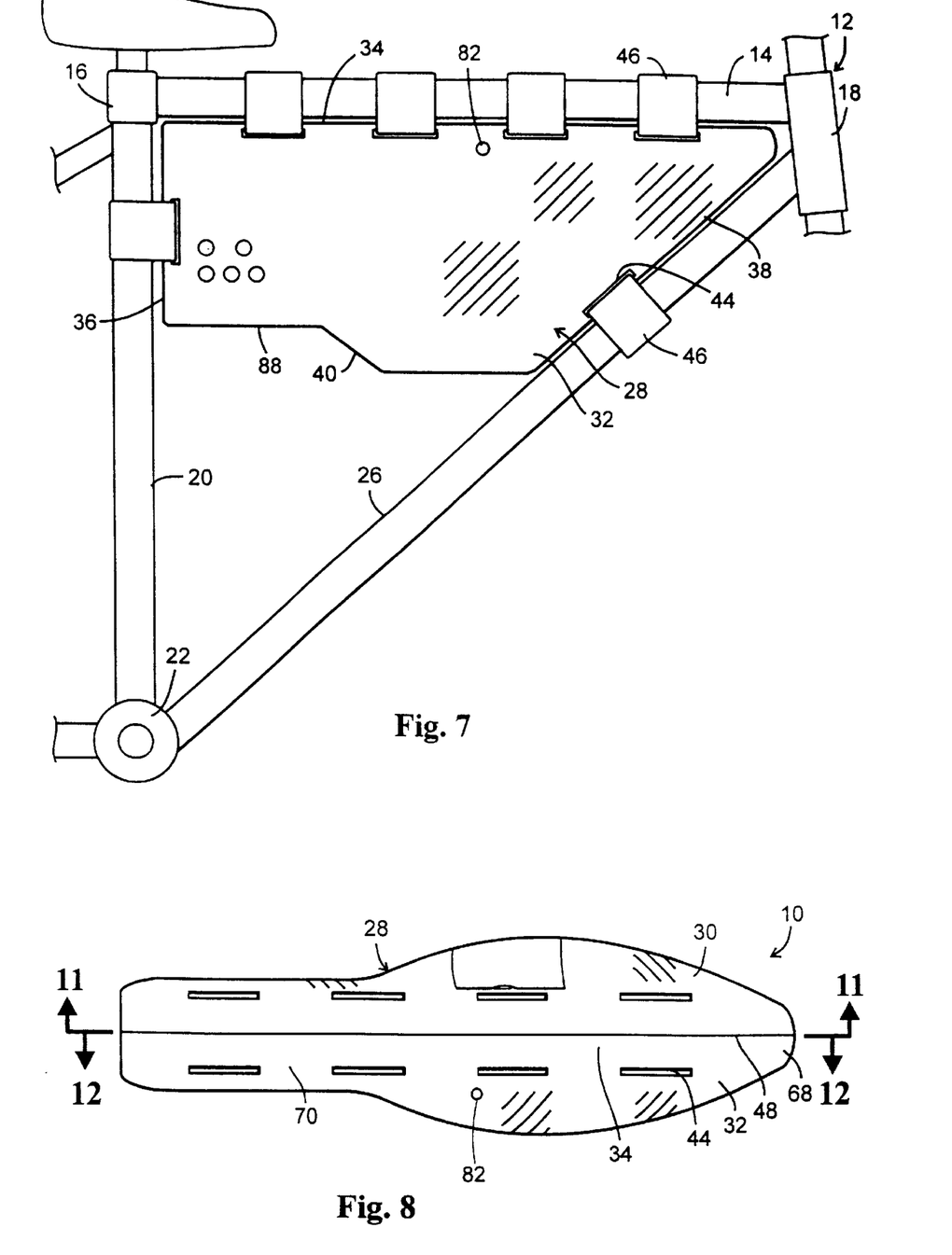
FIG. 7 is a right side view of another embodiment of the present invention mounted on a bicycle.
FIG. 8 is a top view of the device depicted in FIG. 7.

In the embodiment of FIGS. 7–12, the invention also comprises a hollow housing 28 having a left shell 30 and a right shell 32 which is cross sectionally shaped to fit within the interior of triangular opening 26. As best seen in FIG. 7, in the embodiment illustrated therein upper edge 34 of housing 28 abuts first tubular member 14, rear edge 36 of housing 28 abuts second tubular member 20 and front edge 38 of housing 28 abuts third tubular member 24. In this embodiment, lower edge 40 of housing 28 does not extend downwardly to abut bottom bracket 22 as in the previous embodiment. Instead, lower edge 40 is about midway between seat bracket 16 and bottom bracket 22. A cutout portion 88 is provided for free clearance for the pedals of the bicycle.

To mount housing 28 to tubular members 14, 20 and 24, slots 44 are positioned along the periphery of both shells 30, 32 of housing 28. Straps 46 extend through slots 44 and are wrapped around the respective tubular members 14, 20 and 24. Preferably, such straps 46 use hook and loop fasteners to secure each strap 46 to itself. However, as those skilled in the art will recognize, other fastening means including belt buckles, snaps and the like can be employed satisfactorily. The purpose of the fastening means chosen is to detachably secure housing 28 to the frame 12.

As best seen in FIG. 8, mating shells 30, 32 are joined along a centerline 48 to form hollow housing 28. Means for joining the two shells include welding along centerline 48. However, those skilled in the art will recognize many other methods of joining shells 30, 32 are possible, ranging from screws to snap-fits. Housing 28 is narrow enough to permit a rider to pedal without interference.

Housing 28 is preferably made of polyethylene, however, those skilled in the art will recognize that many other materials would be suitable for use. One particular variation of note is to manufacture the device of a transparent plastic whereby the components are visible to the user.

In the illustrated embodiment of FIG. 8, it can be seen that upper edge 34 of each shell 30 and 32 includes a narrow front end 68 and narrow rear end 70 with a wider center 72 therebetween.

Figure 10:
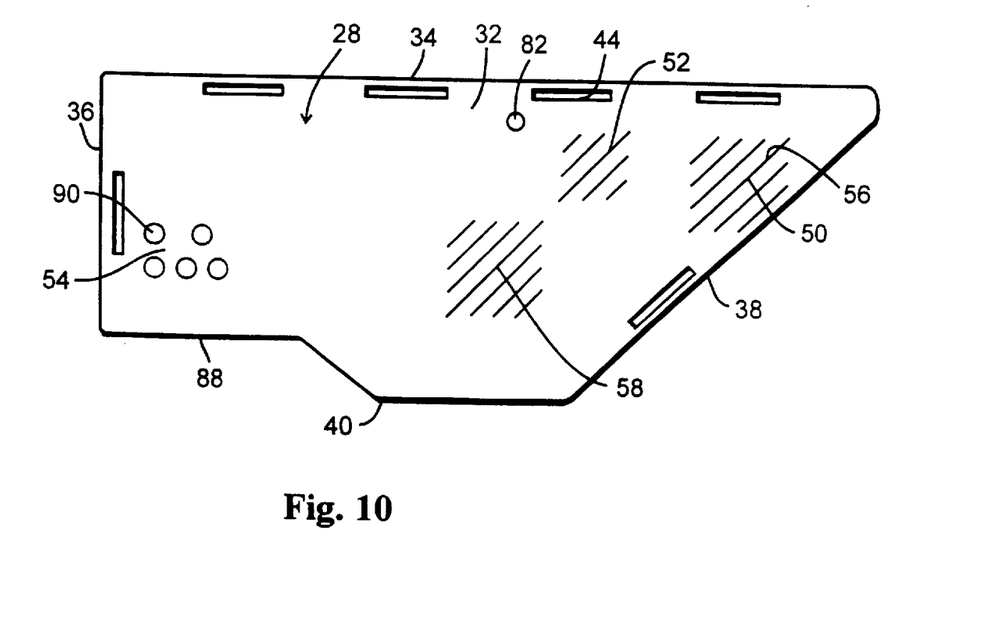
FIG. 10 is a right side view of the embodiment of FIG. 7.
Figure 12:
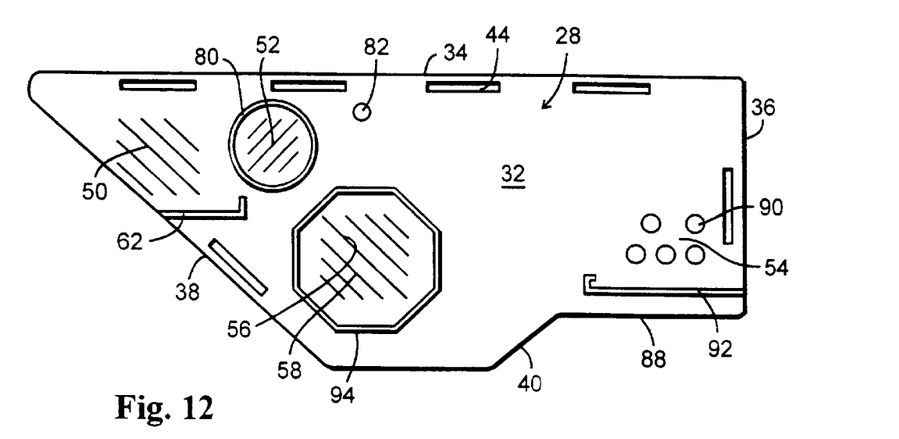
FIG. 12 is a cross sectional side view of the device of FIG. 8 taken along line 12—12.

As best seen in FIGS. 10 and 12, extending through right shell 32 are amplifier vent 50 positioned proximate to the junction of upper edge 34 and front edge 38, a speaker vent 52 positioned near upper edge 34 proximate to amplifier vent 50, battery vent 54 positioned proximate to the junction of lower edge 40 and rear edge 36, and bass speaker vent 58 centered in right half 32. Each vent 50, 52, and 58 comprises a plurality of slits 56 extending completely through right shell 32. In this embodiment, battery vent 54 comprises a plurality of circular holes 90 extending completely through right shell 32. The purpose of speaker vent 52 and bass speaker vent 58 are to allow sound generated by speakers mounted within right shell 32 to exit therefrom while still providing protection thereto. The purpose of amplifier vent 50 and battery vent 54 is to allow air to circulate therethrough to cool the amplifier and battery mounted within right shell 32 abutting said vents.

As best seen in FIG. 12, a number of mounting means are provided for mounting desired components such as speakers, batteries, amplifiers and music players to the interior of right shell 32 of housing 28. It will be understood by those skilled in the art that many other mounting means as well as variations on the mounting means disclosed herein are possible. Mounting means secure the desired components firmly within right shell 32 and hence housing 28 against the vibration encountered when riding a bicycle.

In the illustrated embodiment, L-shaped shelf 62 is mounted underneath amplifier vent 50 for mounting an amplifier (not shown) thereon. The amplifier rests upon L-shaped shelf 62 and is secured thereto by, for example, adhesives or screws (not shown).

A second L-shaped shelf 92 is mounted underneath battery vent 54 for mounting a battery (not shown) thereto. The battery rests upon second L-shaped shelf 92 and is secured thereto by, for example, adhesives or screws (not shown).

An octagonal shelf 94 is mounted to surround bass speaker vent 56 within right half 32 about midway between top 74 and point 76. In the illustrated embodiment, a bass speaker (not shown) is mounted atop octagonal shelf 94. The bass speaker is secured to octagonal shelf 94 by, for example, adhesives or screws.

A circular mount 80 surrounds speaker vent 52 for mounting a speaker (not shown) thereto. The speaker rests within circular mount 80 and is secured thereto by, for example, adhesives or screws (not shown).

Extending through right shell 32 is an jack hole 82 positioned at about the middle of upper edge 34 which can receive an jack (not shown) therein if desired. Such a jack is used for earphones, if the user prefers to listen to music yet not disturb nearby individuals. Or, alternatively, the jack could connect the music components contained therein to, for example, a Sony Walkman music player.

Figure 9:
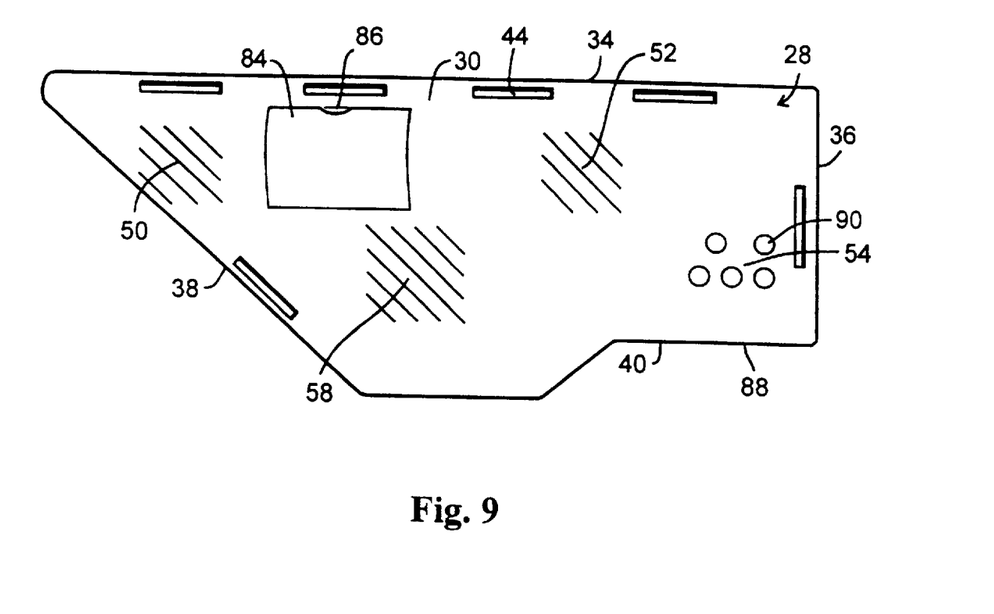
FIG. 9 is a left side view of the device depicted in FIG. 7.
Figure 11:
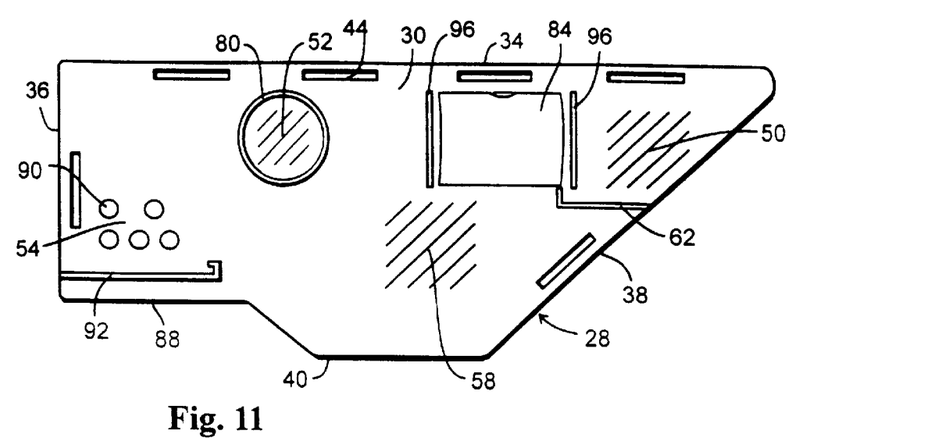
FIG. 11 is a cross sectional side view of the device of FIG. 8 taken along line 11—11.

As best seen in FIGS. 9 and 11, extending through left shell 30 are amplifier vent 50 positioned proximate to the junction of upper edge 34 and front edge 38, a speaker vent 52 positioned near upper edge 34 above cut out portion 88, battery vent 54 positioned proximate to the junction of lower edge 40 and rear edge 36, and bass speaker vent 58 approximately centered in left half 30. Vents 50, 54 and 58 correspond positionally with vents 50, 54 and 58 in right shell 32. However, speaker vent 52 in left shell 30 is positioned rearwardly of speaker vent 52 in right shell 32.

Each vent 50, 52, and 58 comprises a plurality of slits 56 extending completely through left shell 30. In this embodiment, battery vent 54 comprises a plurality of circular holes 90 extending completely through left shell 30. The purpose of speaker vent 52 and bass speaker vent 58 are to allow sound generated by speakers mounted within left shell 30 to exit therefrom while still providing protection thereto. The purpose of amplifier vent 50 and battery vent 54 is to allow air to circulate therethrough to cool the amplifier and battery mounted within left shell 30 abutting said vents.

As best seen in FIG. 11, a number of mounting means are provided for mounting desired components such as speakers, batteries, amplifiers and music players to the interior of left shell 30 of housing 28. It will be understood by those skilled in the art that many other mounting means as well as variations on the mounting means disclosed herein are possible. Mounting means secure the desired components firmly within left shell 30 and hence housing 28 against the vibration encountered when riding a bicycle.

In the illustrated embodiment, L-shaped shelf 62 is mounted underneath amplifier vent 50 for mounting an amplifier (not shown) thereon. The amplifier rests upon L-shaped shelf 62 and is secured thereto by, for example, adhesives or screws (not shown).

A second L-shaped shelf 92 is mounted underneath battery vent 54 for mounting a battery (not shown) thereto. The battery rests upon second L-shaped shelf 92 and is secured thereto by, for example, adhesives or screws (not shown).

A circular mount 80 surrounds speaker vent 52 for mounting a speaker (not shown) thereto. The speaker rests within circular mount 80 and is secured thereto by, for example, adhesives or screws (not shown).

Access to the music player is provided in the illustrated example by a door 84 having a handle 86 mounted thereon. Door 84 is hinged opposite handle 86 to rotate to the open position.

The term "music player" is defined as any of a variety of devices such as a cassette player, a CD player, a radio receiver or any other type of device for generating sound. The music player is mounted beneath door 84 thereby allowing the rider access thereto. The music player is mounted either permanently or detachably as desired by the rider.

In this embodiment, two vertical shelves 96 are mounted on each side of door 84 provide for mounting of the music player therein. In one embodiment, a cassette player is mounted permanently to vertical shelves 96 which the rider has access to via door 84. In this embodiment, the controls of the cassette player control the sound volume and other controls of the system. In another embodiment, a portable music player such as a Sony Walkman is detachably mounted under door 84 between vertical shelves 96. The player connects to the system via jack hole 82 and the player is used to control the sound volume and other features of the system.

Figure 13:
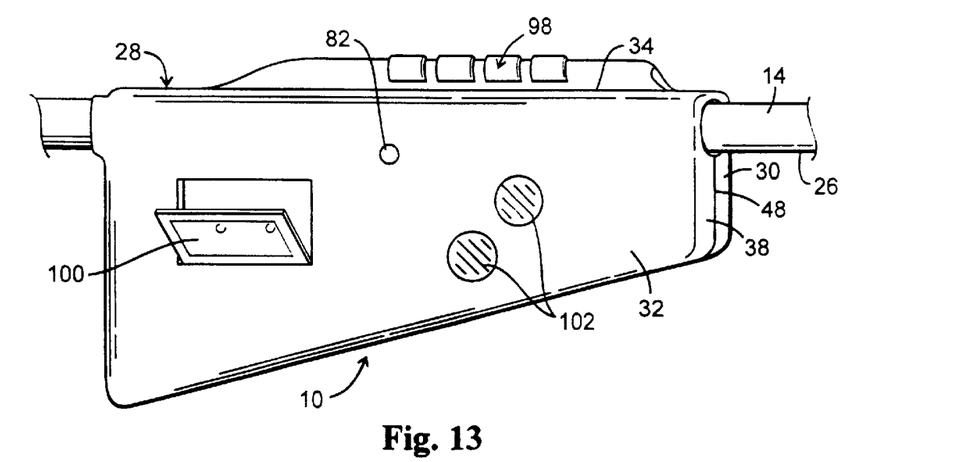
FIG. 13 is a perspective view of a third embodiment of the present invention mounted on a child's bicycle.

FIG. 13 illustrate still another modification of platform 10 shown in FIGS. 1–6 wherein like parts are given the same reference characters. This platform 10 differs from the previous modification in showing a clamshell design as an alternate means of securing the device to the bicycle frame 12.

In the embodiment of FIG. 13, the invention also comprises a hollow housing 28 having a left shell 30 and a right shell 32 which is cross sectionally shaped to fit within the interior of triangular opening 26. In the embodiment of FIG. 13, rear edge 36 of housing 28 abuts second tubular member 20 and front edge 38 of housing 28 abuts third tubular member 24. In this embodiment, lower edge 40 of housing 28 does not extend downwardly to abut bottom bracket 22 as in the previous embodiment. Instead, lower edge 40 is about midway between seat bracket 16 and bottom bracket 22.

To mount housing 28 to tubular members 14, left and right shells 30 and 32 are positioned on opposing sides of tubular member 14. When left and right shells 30 and 32 are brought together, tubular member 14 is captured therebetween, thereby securing platform 10 thereto.

In addition, the embodiment of FIG. 13 includes a control panel 98 mounted on upper edge 34. Control panel 98 has play buttons, reverse, fast forward and volume controls contained thereon. Control panel 98 operates a cassette player 100 and speakers 102 built into right shell 32.

Although only certain embodiments have been illustrated and described, it will be apparent to those skilled in the art that various changes and modifications may be made therein without departing from the spirit of the invention or from the scope of the appended claims.

What is claimed is:

1. A platform for detachably mounting a sound equipment within an opening defined by a cycle frame, the platform comprising:
   a hollow rigid housing;
   means for detachably mounting the hollow housing to an opening defined by a cycle frame;
   means for mounting an amplifier within said housing, an amplifier vent proximate to said means for mounting an amplifier;
   means for mounting a music player within said housing, a music player vent proximate to said means for mounting a music player;
   means for mounting at least one speaker within said housing, at least one speaker vent corresponding to each of the at least one means for mounting a speaker; and
   a door providing access to the hollow housing.

2. The platform of claim 1 wherein the hollow housing is triangular in shape.

3. The platform of claim 1 wherein the hollow housing further comprises a left shell and a right shell, the left shell and the right shell joined along a centerline.

4. The platform of claim 3 wherein the left shell and the right shell are triangular in shape.

5. The platform of claim 3 wherein the means for detachably mounting the hollow housing to a cycle frame comprises mating slots positioned along the periphery of the left shell and the right shell, the detachable means further comprising straps extending through the slots for engaging a cycle frame.

6. The platform of claim 5 wherein the straps are hook and loop fasteners.

7. The platform of claim 4 wherein means for detachably mounting the hollow housing to the cycle frame comprises means for capturing a first tubular member of a cycle frame between said left and right shells.

8. The platform of claim 1 wherein the hollow housing is made of polyethylene.

9. The platform of claim 1 wherein the means for mounting an amplifier, the means for mounting a music player and the means for mounting at least one speaker all comprise a plurality of shelves mounted within the housing.

10. The platform of claim 1 further comprising means for mounting a battery within said housing.

11. The platform of claim 1 wherein the means for mounting an amplifier comprises a horizontal shelf.

12. The platform of claim 1 wherein the means for mounting the music player comprises an upwardly opening U-shaped shelf.

13. The platform of claim 1 wherein the at least one means for mounting a speaker comprises an L-shaped shelf having a horizontal leg and a vertical leg extending upwardly therefrom.

14. The platform of claim 1 wherein the at least one means for mounting a speaker comprises a circular mount.

15. The platform of claim 1 wherein the at least one means for mounting a speaker comprises an octagonal mount.

16. The platform of claim 1 wherein the means for mounting the music player comprises two vertical shelves.

17. The platform of claim 1 further comprising a jack hole suitable for receiving a jack.

18. A platform for detachably mounting a sound equipment to a cycle frame comprising a first tubular member extending horizontally between a seat bracket and a front bracket, a second tubular member connecting to the seat end of first tubular member and extending downwardly therefrom to a bottom bracket, and a third tubular member extending from the bottom bracket to the front bracket, the first, second and third tubular members in combination forming a triangular opening, the platform comprising:
   a hollow rigid housing having a left shell and a right shell joined along a centerline, the hollow housing adapted to fit within a triangular opening of a cycle frame, the hollow housing having an upper edge for abutting a first tubular member of a cycle frame, a rear edge for abutting a second tubular member of a cycle frame, a front edge for abutting a third tubular member of a cycle frame, and a lower edge for abutting a bottom bracket of a cycle frame, the lower edge being arcuate in shape;
   mating slots positioned along the periphery of the left shell and the right shell;
   straps extending through the slots for engaging a cycle frame;

a horizontal shelf for mounting an amplifier mounted within said housing;

means for mounting a music player within said housing;

at least one L-shaped shelf for mounting at least one speaker within said housing, the at least one L-shaped shelf having a horizontal leg and a vertical leg extending upwardly therefrom;

an L-shaped shelf for mounting a battery within said housing, the L-shaped shelf having a horizontal leg and a vertical leg extending upwardly therefrom;

a door providing access to the hollow housing proximate to the means for mounting a music player within said housing;

an amplifier vent comprising a plurality of amplifier vent slits extending through the housing positioned proximate to said horizontal shelf;

a music player vent comprising a plurality of music player vent slits extending through the housing positioned proximate to said means for mounting a music player; and and at least one speaker vent comprising a plurality of speaker vent vent slits extending through the housing positioned proximate to each of the at least one L-shaped shelves.

* * * * *